(12) United States Patent
Schuttenberg et al.

(10) Patent No.: US 9,168,499 B1
(45) Date of Patent: Oct. 27, 2015

(54) ARRANGEMENTS FOR REMOVING ENTRAINED CATALYST PARTICULATES FROM A GAS

(71) Applicant: Pall Corporation, Port Washington, NY (US)

(72) Inventors: Kurt R. Schuttenberg, Freeville, NY (US); Tore H. Lindstrom, Tully, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 14/262,443

(22) Filed: Apr. 25, 2014

(51) Int. Cl.
  *B01J 8/24* (2006.01)
  *B01D 46/24* (2006.01)
  *B01J 8/00* (2006.01)
  *B01D 46/48* (2006.01)
  *B01D 46/00* (2006.01)

(52) U.S. Cl.
  CPC .......... *B01J 8/006* (2013.01); *B01D 46/0042* (2013.01); *B01D 46/0084* (2013.01); *B01D 46/0095* (2013.01); *B01D 46/24* (2013.01); *B01D 46/48* (2013.01); *B01J 8/24* (2013.01); *B01J 2208/00991* (2013.01)

(58) Field of Classification Search
  CPC .... B01J 8/006; B01J 8/009; B01J 2208/0091; B01D 46/0095; B01D 46/0042
  See application file for complete search history.

(56) References Cited

U.S. PATENT DOCUMENTS

| | | | |
|---|---|---|---|
| 2,436,927 A * | 3/1948 | Kassel | 502/42 |
| 2,584,378 A | 2/1952 | Beam | |
| 3,455,457 A | 7/1969 | Popelar | |
| 3,471,024 A | 10/1969 | Doucet | |
| 3,690,842 A | 9/1972 | Lockwood | |
| 3,828,930 A | 8/1974 | Eimer et al. | |
| 3,875,063 A | 4/1975 | Treplin et al. | |
| 4,435,282 A | 3/1984 | Bertolacini et al. | |
| 4,584,003 A * | 4/1986 | Oda et al. | 55/315.2 |
| 5,104,429 A | 4/1992 | Miller | |
| 5,316,662 A | 5/1994 | Cetinkaya | |
| 6,569,217 B1 | 5/2003 | DeMarco | |
| 7,915,191 B2 | 3/2011 | Hedrick | |
| 7,932,204 B2 | 4/2011 | Towler | |
| 7,935,314 B2 | 5/2011 | Couch et al. | |
| 7,947,230 B2 | 5/2011 | Palmas et al. | |
| 8,017,083 B2 | 9/2011 | Senetar et al. | |
| 8,022,022 B2 | 9/2011 | Nelson et al. | |
| 8,025,705 B2 | 9/2011 | Holle et al. | |
| 8,062,506 B2 | 11/2011 | Hedrick et al. | |
| 8,303,688 B2 | 11/2012 | Sharma | |
| 2010/0126350 A1 | 5/2010 | Sharma | |
| 2010/0163495 A1 | 7/2010 | Merino et al. | |
| 2010/0248943 A1 | 9/2010 | Bozzano | |
| 2010/0303698 A1 | 12/2010 | Mehlberg et al. | |
| 2011/0110829 A1 | 5/2011 | da Silva Ferreira Alves et al. | |
| 2011/0155634 A1 | 6/2011 | Lomas et al. | |
| 2011/0155642 A1 | 6/2011 | Huziwara et al. | |
| 2011/0269620 A1 | 11/2011 | Myers et al. | |
| 2011/0297584 A1 | 12/2011 | Chen | |

* cited by examiner

*Primary Examiner* — Lessanework Seifu
(74) *Attorney, Agent, or Firm* — Leydig, Voit & Mayer

(57) ABSTRACT

An arrangement for removing entrained catalyst particulates from a gas may include a pressure vessel, a filter assembly, and a dip leg. The pressure vessel may contain a fluidized bed of catalyst particulates suspended in the gas. Some of the gas and entrained catalyst particulates may be directed to the filter assembly where the entrained catalyst particulates are filtered from the gas by a filter medium. The catalyst particulates pass generally tangentially along a feed side of the filter medium, where they scour the feed side of the filter medium, and then pass into the dip tube which guides the catalyst particulates away from the filter medium.

15 Claims, 2 Drawing Sheets

ARRANGEMENTS FOR REMOVING ENTRAINED CATALYST PARTICULATES FROM A GAS

DISCLOSURE OF THE INVENTION

The present invention relates to arrangements for removing entrained catalyst particulates from a gas, where gas includes a vapor. In the refinery and chemical industries, small catalyst particulates are used in fluid catalytic cracking systems to process oil into more refined hydrocarbons, such as gasoline or diesel fuel. The catalyst particulates may be suspended with this oil in a fluidized bed in a reactor vessel, where the oil is broken down into its more refined hydrocarbon constituents. After a time, the catalyst particulates become fouled with foulants, such as a coke-like substance, that lessen the catalytic effect of the catalyst particulates. The catalyst particulates must then be regenerated before they can be reused. The fouled catalyst particulates may be transferred to a regenerator vessel where they are suspended in a fluidized bed of hot gas, e.g., hot air, and the foulants are burned off of the catalyst particulates. The regenerated catalyst particulates may then be returned to the reactor vessel for reuse. Other industries, including the catalyst manufacturing industry, may similarly involve suspending catalyst particulates in a gas in a fluidized bed. In all of these environments, a portion of the gas and entrained catalyst particulates may be extracted from the fluidized bed, and the entrained catalyst particulates may be removed from the gas in accordance with the arrangements embodying the invention. The gas may then be discharged, e.g., for further processing or as waste gas, while the catalyst particulates may be collected, e.g., for use in an industrial process.

In accordance with one aspect of the invention, arrangements for removing catalyst particulates from a gas may comprise a pressure vessel, a filter assembly, and a dip leg. The pressure vessel may have a lower region and an upper region. The lower region may be arranged to contain a fluidized bed of catalyst particulates suspended in a gas, and the upper region may be arranged to receive gas and entrained catalyst particulates elutriated or dispersed from the fluidized bed. The pressure vessel may also include a gas inlet for supplying gas to the lower region containing the fluidized bed. The filter assembly may be coupled to the pressure vessel to receive gas and entrained particulates dispersed from the fluidized bed. The filter assembly may include an inlet, first and second outlets, and a permeable filter medium. The filter medium may have a feed side and a filtrate side isolated from the feed side by the filter medium. The filter assembly may define a first flow path between the inlet and the first outlet through the filter medium from the feed side to the filtrate side. As the gas travels along the first flow path through the permeable filter medium, the filter medium removes most or substantially all of the entrained catalyst particulates from the gas, leaving the filtered gas on the filtrate side of the filter medium and the catalyst particulates on the feed side of the filter medium. The filter assembly may also define a second flow path between the inlet and the second outlet tangentially along the feed side of the filter medium. As the gas and entrained catalyst particulates travel along the second flow path, the catalyst particulates scour the feed side of the filter medium, preventing foulants from building up on the feed side and blocking off the filter medium. The dip leg may have an inlet and an outlet, and the second outlet of the filter assembly may be fluidly coupled to the inlet of the dip leg.

In accordance with another aspect of the invention, arrangements for removing catalyst particulates from a gas may comprise a regenerator vessel, a filter assembly, and a dip leg. The regenerator vessel may have a lower region and an upper region. The lower region may be arranged to contain a fluidized bed of catalyst particulates suspended in a gas, and the upper region may be arranged to receive gas and entrained catalyst particulates dispersed from the fluidized bed. The regenerator vessel may also include a gas inlet for supplying gas to the lower region containing the fluidized bed, a regenerated catalyst outlet in the lower region, and a filtered gas outlet in the upper region. The filter assembly may be supported in the upper region of the regenerator vessel to receive the gas and entrained catalyst particulates dispersed from the fluidized bed. The filter assembly may include an inlet, first and second outlets, and a permeable filter medium. The filter medium may have a feed side and a filtrate side isolated from the feed side by the filter medium. The filter assembly may define a first flow path between the inlet and the first outlet through the filter medium from the feed side to the filtrate side. As the gas travels along the first flow path through the permeable filter medium, the filter medium removes most or substantially all of the entrained catalyst particulates from the gas, leaving the filtered gas on the filtrate side of the filter medium and the catalyst particulates on the feed side of the filter medium. The first outlet of the filter assembly may fluidly communicate with the filtered gas outlet of the regenerator vessel, allowing the filtered gas on the filtrate side of the filter medium to exit the fitter assembly and the regenerator vessel. The filter assembly may also define a second flow path between the inlet and the second outlet tangentially along the feed side of the filter medium. As the gas and entrained catalyst particulates travel along the second flow path, the catalyst particulates scour the feed side of the filter medium, preventing foulants from building up on the feed side and blocking off the filter medium. The dip leg may be supported in the regenerator vessel below the filter assembly and may have an inlet and outlet. The inlet of the dip leg may be fluidly coupled to the second outlet of the filter assembly. The outlet of the dip leg may be arranged to discharge catalyst particulates into the lower region of the regenerator vessel which contains the fluidized bed.

Arrangements embodying the invention have many advantageous features. For example, by directing the gas along the first flow path in the filter assembly and filtering the gas and entrained catalyst particulates through a fitter medium, a very large portion of the entrained catalyst particulates, including the finest particulates, may be effectively and efficiently removed from the gas. Consequently, components downstream of the filter medium, such as pipes, valves, heat exchangers, fractionators, power recover equipment, etc., function more reliably because the filtered gas has few if any catalyst particulates to foul or abrade the downstream components. The environment is better protected because emissions of the filtered gas have exceedingly few catalyst particulates. For example, emissions of the filtered gas may have a particulate load as low as about 15 mg/Nm$^3$ or less, 10 mg/Nm$^3$ or less, 5 mg/Nm$^3$ or less, or even 2 mg/Nm$^3$ or less, where Nm$^3$ is a normal cubic meter of gas, i.e., a cubic meter of gas at 0° C. and 1.01325 bar absolute. Further, by directing the catalyst particulates along the second flow path and continuously scouring the feed side of the filter medium, the filter medium remains clean and highly effective for an extended period of time even when the particulate load on the feed side is extremely high.

DESCRIPTION OF EMBODIMENTS OF THE INVENTION

Figure 1:
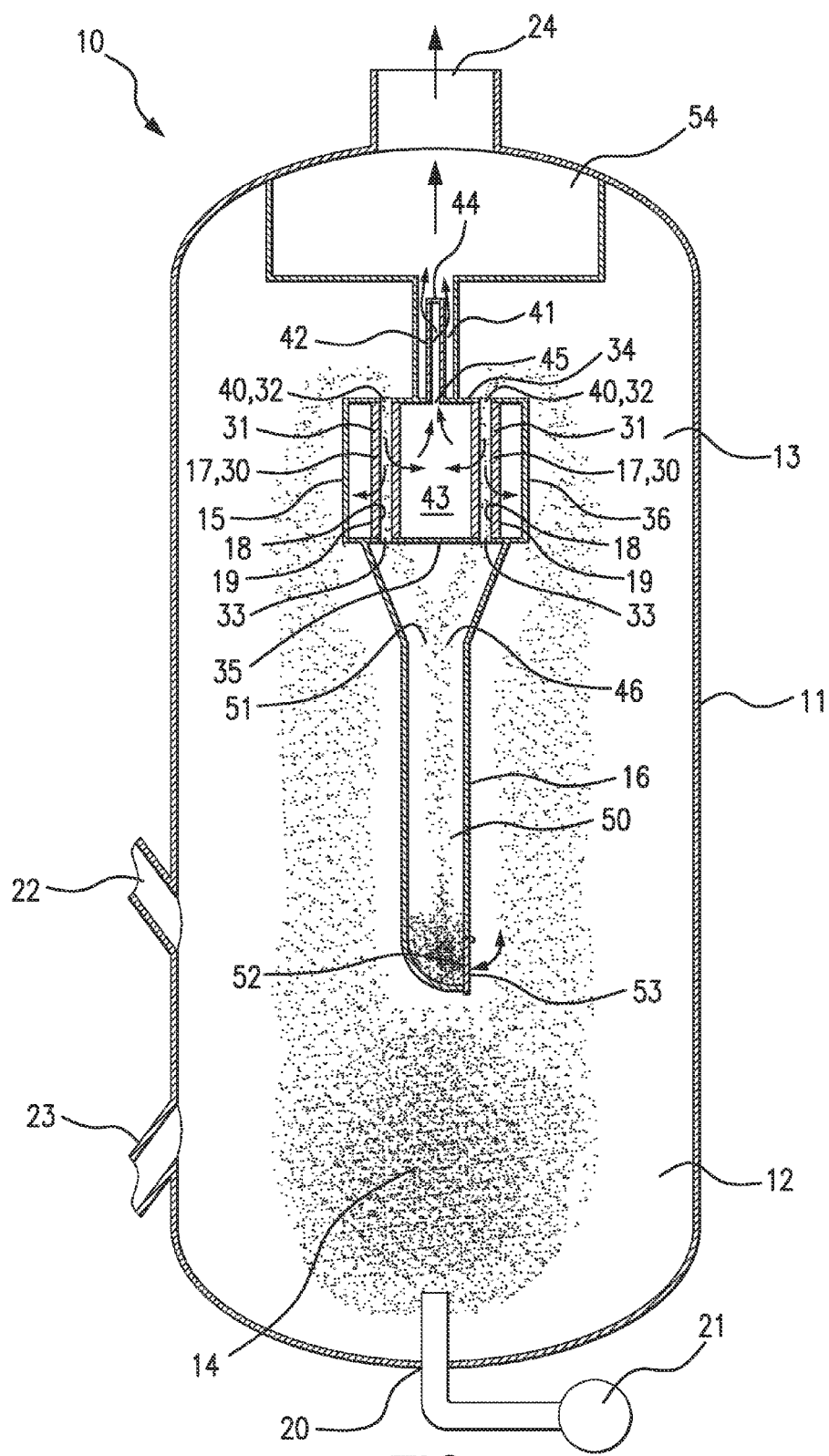
FIG. 1 is a representative view of an embodiment of an arrangement for removing entrained particulates from a gas.

Many different arrangements for removing entrained catalyst particulates from a gas, including a vapor, may embody the invention. In one of numerous examples, as shown in FIG. 1, the arrangement 10 may include a pressure vessel 11 having a lower region 12 and an upper region 13. The lower region 12 may be arranged to contain a fluidized bed 14 of catalyst particulates suspended in a gas. The upper region 13 may be arranged to receive gas and entrained catalyst particulates that are elutriated or dispersed from the fluidized bed 14. The arrangement 10 may also include a filter assembly 15 and a dip leg or dip tube 16. The filter assembly 15 includes a permeable filter medium 17 having a feed side 18 and a filtrate side 19 isolated from the feed side 18 by the filter medium 17. The gas and entrained catalyst particulates that are dispersed from the fluidized bed 10 may be driven into the filter assembly 15, either by the pressure within the pressure vessel or by a blower, a fan, or compressor (not shown). Within the filter assembly 15, the filter medium 17 filters the entrained catalyst particulates from the gas, leaving the catalyst particulates on the feed side 18 and the filtered gas on the filtrate side 19. The filtered gas may be discharged from the filter assembly 15, and the dip leg 17 may guide the catalyst particulates away from the filter medium 17.

The pressure vessel may be configured in any of numerous ways. For example, the pressure vessel may be a single wall or multi-wall vessel; it may have a single compartment or chamber or it may have multiple compartments; it may serve any of several functions, e.g., it may be a reactor vessel, a regenerator vessel, a gasifier vessel, or a calcination or activation vessel; and it may have any of a wide variety of shapes and sizes. For many embodiments, the pressure vessel 11 may be generally cylindrical and very large. For example, the diameter may be about 5 feet or 10 feet or 20 feet or more and the height may be about 15 feet or 30 feet or 50 feet or more. Further, the pressure vessel may have sufficient structural integrity to withstand an operating pressure in the range from about 5 psig or less to about 1200 psig or more and an operating temperature in the range from about 70° F. or less to about 1800° F. or more, e.g., in the range from about 550° F. or less to about 1400° F. or more.

The pressure vessel may have any number of inlet ports and outlet ports. For example, the pressure vessel 11 may include a gas inlet 20 for supplying gas to the pressure vessel 11, e.g., to the lower region 12 near the fluidized bed 14. A gas supply 21 may be coupled to the pressure vessel 11 via the gas inlet 20 and may direct any of a variety of gases, e.g., air, into the pressure vessel 11 at any desired operating temperature and pressure, for example, to form and/or maintain the fluidized bed 14. The pressure vessel 11 may further include a catalyst particulate inlet 22 for supplying catalyst particulates to the pressure vessel 11, e.g., to the lower region 12 near the fluidized bed 14, from any of a variety of sources. In the embodiment of FIG. 1, the pressure vessel 11 may be a regenerator vessel, and the catalyst particulates may be fouled catalyst particulates supplied to the regenerator vessel via the catalyst particulate inlet 22 from a fluid catalytic cracking reactor (not shown). The pressure vessel 11 may also include a catalyst particulate outlet 23 for discharging the catalyst particulates from the pressure vessel 11, e.g., for further processing, for use, or for disposal. In the illustrated embodiment, the fouled catalyst particulates may be regenerated in the fluidized bed 14, and the catalyst particulate outlet 23 may be located in the regenerated vessel 11 in the lower region 12 near the fluidized bed 14. The regenerated catalyst particulates may be directed from the regenerator vessel 11 via the catalyst particulate outlet 23 back to the reactor for reuse. Additionally, for many embodiments, the filter assembly 15 may be positioned within the pressure vessel 11. The filter assembly 15 may be supported in the interior of the pressure vessel 11 in a variety of ways. For example, the filter assembly 15 may be positioned in the pressure vessel 11 above the fluidized bed 14, e.g., in the upper region 13 in the gas and entrained catalyst particulates dispersed from the fluidized bed 14, as shown, for example, in FIG. 1. The pressure vessel 11 may then include a filtered gas outlet 24 for discharging the gas filtered by the fitter medium 17 from the pressure vessel 11, e.g., for further processing or use or as waste gas.

The permeable filter medium 17 may be configured in any of numerous ways. For example, the filter medium may be formed or incorporated into a wide variety of structures. For many, but not all, embodiments, the filter medium may be formed as a plurality of hollow, elongate filter tubes 30, each having a cylindrical wall 31, which includes the filter medium 17, and opposite ends 32, 33. For many embodiments, the feed side 18 may be the inner side of the filter tube 30 and the filtrate side 19 may be the outer side of the fitter tube 30, and both ends 32, 33 maybe open ends. The length of the filter tube may be in the range from about 4 inches or less to about 240 inches or more, or from about 10 inches or less to about 100 inches or more, or form about 15 inches or less to about 60 inches or more, e.g., about 25 inches. The inner diameter (ID) of the filter tube may be in the range from about 0.25 inch or less to about 12 inches or more, or about 0.4 inch or less to about 6 inches or more, or about 0.6 inches or less to about 2 inches or more, e.g., about 0.75 inch. The ID of the filter tube may be constant or may taper from one end of the tube to the opposite end, e.g., the ID may taper to a smallest diameter at the outlet or vice versa.

The permeable filter medium may have any of numerous filtering characteristics. For example, the filter medium may be porous, microporous, ultraporous, or even nanoporous and may have any desired gas removal rating. For example, the gas removal rating may be in the range from about $0.01\mu$ or less to about $100\mu$ or more, or from about $0.2\mu$ or less to about $20\mu$ or more, or from $2\mu$ or less to about $10\mu$ or more. Further, the filter medium may be fashioned from any of a variety of materials, including a metallic material, a ceramic material, or a polymeric material. A metallic material or a ceramic material may be used for higher temperature applications.

The filter assembly 15 may also be configured in a variety of ways. For example, the filter assembly 15 may include first and second tube sheets 34, 35 spaced from one another, and up to about 1000 or more, or up to about 3000 or more, or up to about 10,000 or more filter tubes may be supported between the tube sheets. For many embodiments, the filter tubes may be supported generally vertically between the tube sheets. The filter assembly 15 may also include a casing 36 which surrounds the filter tubes 30 and the tube sheets 34, 35. The filter assembly 15 may further include an inlet 40 for receiving the gas and entrained catalyst particulates. In the illustrated embodiment, the inlet 40 of the filter assembly 15 may comprise the entire upper end of the casing 36.

The filter assembly 15 may also include a filtered gas outlet 41 and may define a first flow path from the inlet 40 of the filter assembly 15 to the filtered gas outlet 41. The first flow path may extend from the inlet 40 of the filter assembly 15 through the filter medium 17 from the feed side 18 to the filtrate side 19 and hence to the filtered gas outlet 41. For many embodiments, the first fluid flow path may extend from the inlet 40 of the filter assembly 15, into the open upper inlet ends 32 of the filter tubes 30, axially, e.g., downwardly, along the inner feed sides 18 of the filter tubes 30, generally radially outside-in through the walls of the filter tubes 30, to the out filtrate sides 19 of the filter tubes 30 and hence to the filtered gas outlet 41 of the filter assembly 15.

The filter assembly 15 may also include one or more safety filters 42 in the first flow path between the filter medium 17 and the filtered gas outlet 41. For example, the tube sheets 34, 35 may be sealed to the casing 36, and the filter assembly 15 may include a filtered gas chamber 43 in the first flow path downstream of the filter medium 17, e.g., downstream of the filter tubes 30. The filtered gas chamber 43 may be bounded by the filtrate side 19, e.g., the outer sides of the filter tubes 30, the tube sheets 34, 35, and the casing 36. One or more safety filters 42 may be mounted in the filtered gas chamber 43 or the filtered gas outlet 41 of the filter assembly 15. For example, one or more elongate, hollow safety filters 42, each having a blind end 44 and an open end 45, may be positioned in the filtered gas outlet 41 or the filtered gas chamber 43 and supported by at least one tube sheet 34, 35. The open end 45 of the safety filter(s) 42 may, for example, open into the filtered gas chamber 43 of the filter assembly 15. Each safety filter may include a permeable filter medium which may be coarser than the filter medium of the filter tubes but which protects against failure, e.g., rupture of the fitter tubes. Alternatively or additionally, the filtered gas chamber, including the space between the filter tubes, may be filled with a coarse bulk filter medium, such as metal fibers, coarse ceramic particles or fibers, ceramic foam, or polymeric fibers. The bulk filter medium may act as a deep bed safety filter, capturing catalyst particulates that might bypass a defective filter tube. A bulk filter medium has the further advantage of sealing off very few filter tubes, e.g., the defective filter tube and perhaps one or more neighboring filter tubes, while leaving the vast remainder of the filter tubes perfectly functional.

The filter assembly 15 may also include a catalyst particulate outlet 46. In the illustrated embodiment, the catalyst particulate outlet 46 may include a generally conical particulate outlet at the lower end of the casing 36. The filter assembly 15 may define a second flow path from the inlet 40 of the filter assembly 15 to the catalyst particulate outlet 46. The second flow path may extend from the inlet 40 of the filter assembly 15 generally tangentially along the feed side 18 of the filter medium 17 to the catalyst particulate outlet 46. For many embodiments, the second flow path may extend from the inlet 40 of the filter assembly 15, into the open upper ends 32 of the filter tubes 30, axially, e.g., downwardly, along the inner feed sides 18 of the filter tubes 30, out the open lower ends 33 of the filter tubes 30, and into the catalyst particulate outlet 46 of the filter assembly 15.

The dip leg 16 may be variously configured to guide catalyst particulates and underflow gas, i.e., gas that passes beyond the feed side 18 of the filter medium 17 without passing through the filter medium 17, away from filter assembly 15, e.g., away from the feed side 18 of the filter medium 17. For example, the dip leg 16 may include an elongate, hollow leg 50 having an open inlet end 51 and an outlet end 52. The open inlet end 51 of the dip leg 16 may be connected to the filter assembly 15 beyond the feed side 18 of the filter medium 17. For many embodiments, the dip leg 16 may be positioned inside the pressure vessel 11 and may be supported generally vertically below the filter assembly 15 and above the fluidized bed 14. For example, the dip leg 16 may be connected below the filter assembly 15 with the open inlet end 51 of the dip leg 16 fluidly communicating with the catalyst particulate outlet 46 of the filter assembly 15. The open lower ends 33 of the filter tubes 30 may open into the catalyst particulate outlet 46 of the filter assembly 15 which, in turn, may open into the open inlet end 51 of the dip leg 16. The hollow leg 50 may have a length in the range from about 1 foot or less to about 30 feet or more, and the ID of the leg 50 may be in the range from about 2 inches or less to about 24 inches or more. The outlet end 52 of the dip leg 16 may include a valve 53 which may be alternately closed and open. The valve may be variously configured. For example, the valve may be a flap valve which is normally closed, e.g., by a spring or by the weight of the valve, to prevent gas and entrained catalyst particulates from entering the dip leg through the outlet end. Catalyst particulates may settle by gravity or other means along the axial length of the hollow leg 50, becoming more dense in the lower region of the leg 50. As catalyst particulates accumulate within the leg 50 at the outlet end 52, the weight of the catalyst particulates may force the valve 53 to open, e.g., to pivot open, against the closing force of the valve 53, allowing a portion of the catalyst particulates and underflow gas to escape the dip leg 16.

The arrangement may operate in a wide variety of ways, and any of numerous chemical reactions may be carried out within the pressure vessel, including within the fluidized bed. For example, fouled catalyst particulates may be supplied within the regenerator vessel 11 via the catalyst particulate inlet 22 and a hot gas, e.g., hot air, may be supplied within the regenerator vessel 11 from the gas supply 21 via the gas supply inlet 20 to form and maintain the fluidized bed 14 of catalyst particulates suspended in the hot air. The fouled catalyst particulates may have a size distribution in which 99 percent of the catalyst particulates are smaller than about 90µ and $D_{50}$ is about 60µ. The temperature and pressure within the regenerator vessel 11 may be in the range from about 1250° F. or less to about 1400° F. or more and from about 15 psig or less to about 45 psig or more. The chemical reaction within the regenerator vessel 11 may be a combustion reaction in which the foulants are burned off of the catalyst particulates.

A portion of the gas, e.g., the hot air and any gaseous combustion products, and entrained catalyst particulates may disperse from the fluidized bed and may be driven to the upper region 13 of the regenerator vessel 11 and into the inlet 40 of the filter assembly 15 by the pressure within the regenerator vessel 11 or by a blower, fan, or compressor (not shown). From the inlet 40 of the filter assembly 15, the gas and entrained catalyst particulates may enter the open upper ends 32 of the filter tubes 30. The axial velocity of the gas within the filter tubes 30 may be in the range from about 0.33 ft/sec to about 100 ft/sec and the particulate load may be in the range from about 0.1 lb/ft$^3$ or less to about 10 lbs/ft$^3$ or more or in the range from about 0.1 volumetric percent to about 50 volumetric percent.

Much of the gas may travel along the first fluid flow path within the filter assembly 15 through the filter medium 17, e.g., generally radially inside-out through the filter tubes 30, to the filtered gas outlet 411 of the filter assembly 15. Filtering the gas through the filter medium 17 removes most or substantially all of the catalyst particulates from the gas. The flux rate through the fitter medium 17 may be in the range from about 0.001 m/sec to about 0.25 m/sec and the particulate load in the filtered gas may be very low, e.g., about 15 mg/Nm$^3$ or less. From the filtered gas outlet 41 of the filter assembly 15, the filtered gas may be directed to the filtered gas outlet 24 of the regeneration vessel 11, either directly or via a filtered gas plenum 54. More than one filter assembly may be positioned within the pressure vessel 11, e.g., within the regeneration vessel, and the filtered gas outlet of each filter assembly may be fluidly coupled to the filtered gas plenum. The filtered gas may be discharged via the filtered gas outlet 24 of the regenerator vessel 11, for example, to the environment as waste gas with little or no particulates emissions.

Gas and entrained particulates may travel along the second flow path within the filter assembly 15 to the catalyst particulate outlet 46. As the catalyst particulates pass generally tangentially along the feed side 18 of the filter medium 17, for example, generally axially, e.g., downwardly, along the inner feed sides 18 of the filter tubes 30, the catalyst particulates scour the feed side 18, removing foulants such as a filter cake of catalyst particulates that might otherwise block flow through the filter medium 17. Scouring the feed side 18 of the filter medium 17 allows gas to freely pass along the first flow path through the filter medium 17, e.g., through the filter tubes 30, for an extended period of time.

From the catalyst particulate outlet 46 of the filter assembly 15, the catalyst particulates and the underflow gas may enter the open inlet end 51 of the dip leg 16, flow along the hollow leg 50, and recurrently pass through the valve 53 at the outlet end 52 of the dip leg 16, for example, when the weight of the accumulated catalyst particulates overcomes the closing force of the valve 53. While the density of the catalyst particulates at the outlet end 52 of the dip leg may be greater than the density at the open inlet end 51, the catalyst particulates at the outlet end 52 may remain fluidized by the underflow gas, allowing the accumulated catalyst particulates to readily flow within the hollow leg 50 and from the outlet end 52 of the dip leg 16. The length and ID of the hollow leg 50 and the closing force of the valve 53 may be empirically adjusted to provide any desired underflow from the filter assembly 15 into the open inlet end 51 of the dip leg 16. The underflow may be less than about 60 percent of the gas which is initially directed to the feed side 18 of the filter medium 17, e.g., into the open upper ends 32 of the filter tubes 30. For many embodiments, the underflow may be about 40 percent or less, or about 20 percent or less, or about 10 percent or less, or about 7 percent or less, or about 5 percent or less of the gas initially directed to the feed side of the filter medium. About 98 percent or less of the gas initially directed to the feed side of the filter medium may pass through the filter medium, e.g., through the filter tubes. From the outlet end 52 of the dip leg 16, the catalyst particulates and the underflow gas may be discharged into the regenerator vessel 11, e.g., into the lower region 12 of the regenerator vessel 11 and the fluidized bed 14. From the lower region 12 of the regenerator vessel 11, the regenerated catalyst particulates may be discharged from the regenerator vessel 11 via the catalyst particulate outlet 23. For example, the regenerated catalyst particulates may be discharged for reuse in the fluid catalytic cracking reactor.

While various aspects of the invention have been described and/or illustrated with respect to several embodiments, the invention is not limited to these embodiments. For instance, one or more features of these embodiments may be eliminated or modified, or one or more features of one embodiment may be combined with one or more features of another embodiment, without departing from the scope of the invention. Even embodiments with very different features may fall within the scope of the invention.

Figure 2:
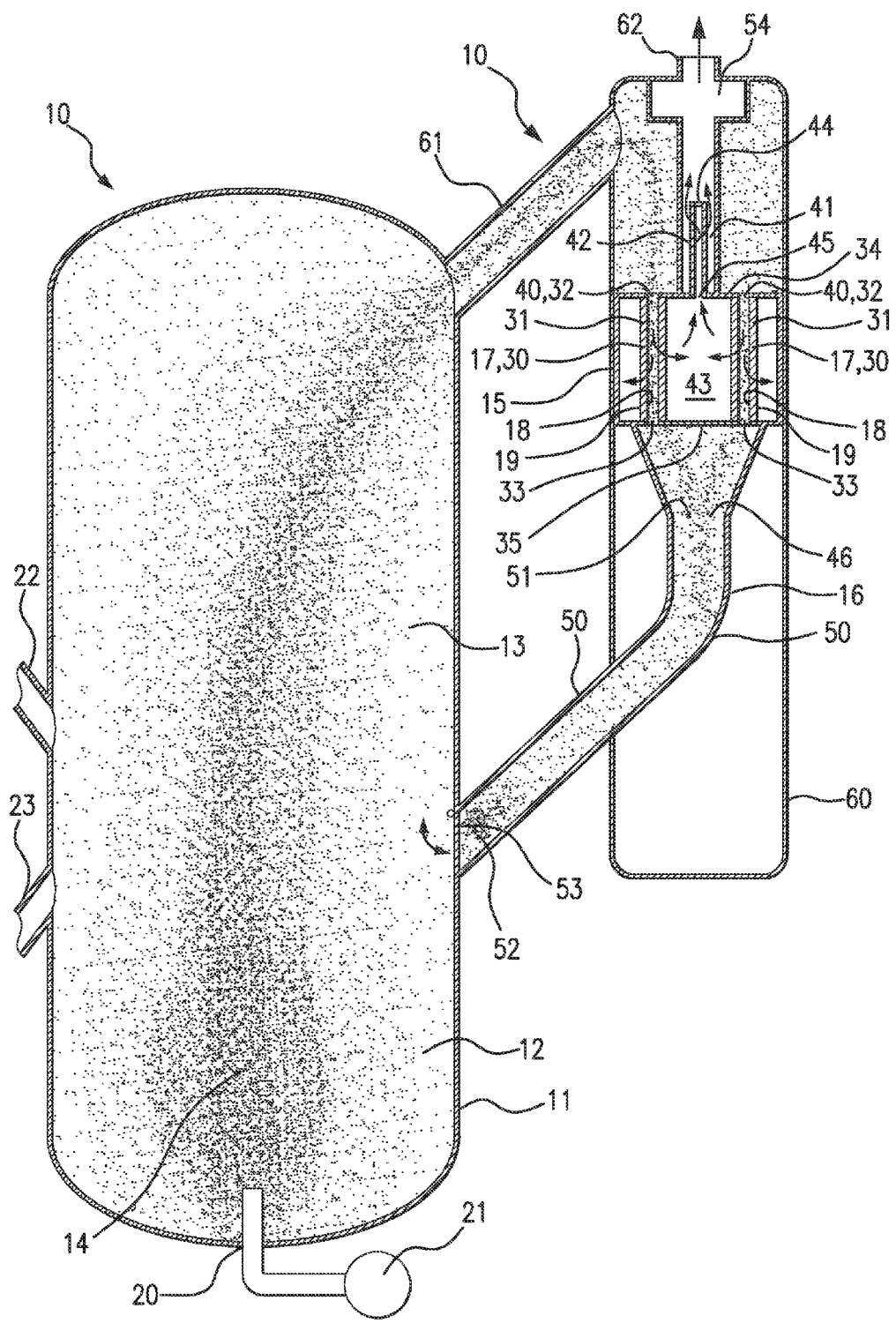
FIG. 2 is a representative view of another embodiment of an arrangement for removing entrained particulates from a gas.

For example, the filter assembly and the dip leg may be positioned outside of the pressure vessel in any of numerous ways. For some embodiments, the filter assembly 15 and the dip leg 16 may be located in a common separate housing 60 outside of the pressure vessel 11 with the dip leg 16 positioned below the filter assembly 15, as shown in FIG. 2. The housing 60 may substitute for the casing 36 in the filter assembly of FIG. 1, and the pressure vessel 11 of FIG. 2 may not have the filtered gas plenum 54 and the filtered gas outlet 24 of the pressure vessel 11 in FIG. 1, but otherwise the pressure vessels 11, the filter assemblies 15 and the dip legs 16 of FIGS. 1 and 2 may be very similar. (Common components have the same reference numerals.)

The housing may fluidly communicate with the pressure vessel in a variety of ways. For example, a first duct or pipe 61 may extend between the pressure vessel 11 and the housing 60 to deliver the dispersed gas and entrained catalyst particulates from the interior of the pressure vessel 11, e.g., the upper region 13 of the pressure vessel 11, to the inlet 40 of the filter assembly 15. The entrained catalyst particulates may be filtered from the gas by the filter medium 17, e.g., the filter tubes 30, just as they are in the filter assembly 15 of FIG. 1. The filtered gas may pass from the filtered gas outlet 41 of the filter assembly of FIG. 2 to the filtered gas outlet 62 of the housing 60, where it may be discharged for further processing or as waste gas. Similarly, the catalyst particulates may scour the feed side 18 of the filter medium 17, e.g., the inner feed sides 18 of the filter tubes 30, and may pass through the dip leg 16 just as they did in the filter assembly 15 and the dip leg 16 of FIG. 1. For some embodiments, the hollow leg 50 of the dip leg 16 may extend between the housing 60 and the pressure vessel 11 to return the catalyst particulates and the underflow gas to the pressure vessel 11, e.g., to the lower region 12 near the fluidized bed 14. The catalyst particulates may be driven along the hollow leg 50 by gravity or other means.

As an example of another embodiment, the fitter assembly may be arranged with the feed side and the filtrate side of the filter medium comprising the outside and the inside, respectfully, of each filter tube. One end of each filter tube, e.g., the tower end, may be blind while the other end, e.g., the upper end, may be open. The gas may then travel along a first flow path from the outer feed side of each filter tube generally radially outside-in through the wall of the filter tube to the inner filtrate side of the filter tube. The inner filtrate side of each filter tube may fluidly communicate, either directly or via a safety filter, with the filtered fluid outlet of the filter assembly. The filtered gas may be discharged from the inner filtrate side of each filter tube to the filtered gas outlet of the filter assembly via the open end of the filter tube and hence to the filtered gas outlet of the vessel, either directly or via a filtered gas plenum that is fluidly coupled to the open ends of the filter tubes. Similarly, the catalyst particulates may travel along a second flow path generally axially, e.g., downwardly, along the outer feed side of each filter tube to scour the outer feed side. For example, the catalyst particulates may pass generally axially, e.g., downwardly, along the entire length of the outer feed side of the filter tube past the lower blind end and then into the dip leg.

In other embodiments, each filter tube may be fitted with a hollow impermeable accelerator tube at the inlet end of the permeable filter tube. The accelerator tube may have a length in the range from about 2 inches or less to about 30 inches or more and may have a constant or tapering ID that equals or tapers to the ID of the filter tube. The accelerator tube may serve to accelerate the particulates and/or the gas before they contact the feed side of the filter medium, e.g., the inner feed side of the filter tubes, enhancing the scouring effect of the particulates.

In still other embodiments, a diverter may be inserted within the inner feed side of a filter tube or along the outer feed side of a filter tube to deflect particulates against the feed side of the filter tube. The diverter may be variously shaped and may extend partially or entirely along the length of the filter tube. By deflecting the particulates against the feed side of the filter tube, even more of the particulates strike the feed side of the filter tube, enhancing the scouring effect of the particulates.

Many other techniques may supplement processes embodying the invention. For example, an intermittent as pulse may be directed forward or backward through the filter medium to further clean the filter medium of foulants, a vibrator may intermittently vibrate the filter medium or the filtered gas flow through the filter medium may be intermittently terminated to loosen foulants from the filter medium, or a cleaning solution may be applied to the filter medium to wash foulants from the filter medium.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An arrangement for removing catalyst particulates from a gas, the arrangement comprising:
a pressure vessel having a lower region arranged to contain a fluidized bed including catalyst particulates suspended in a gas, an upper region arranged to receive gas and entrained catalyst particulates dispersed from the fluidized bed, and a gas inlet for supplying gas to the lower region containing the fluidized bed;
a filter assembly coupled to the pressure vessel to receive the gas and entrained particulates dispersed from the fluidized bed, wherein the filter assembly includes an inlet, first and second outlets, and a permeable filter medium having a feed side and a filtrate side isolated from the feed side by the filter medium and wherein the filter assembly defines a first flow path between the inlet and the first outlet through the filter medium from the feed side to the filtrate side and a second flow path between the inlet and the second outlet tangentially along the feed side of the filter medium;
a safety filter positioned in the first flow path between the filter medium and the first outlet of the filter assembly; and
a dip leg having an inlet and an outlet, wherein the second outlet of the filter assembly is fluidly coupled to the inlet of the dip leg.

2. The arrangement of claim 1 wherein the filter assembly is supported within the upper region of the pressure vessel and the dip leg is supported within the pressure vessel below the filter assembly and wherein the pressure vessel includes a filtered gas outlet fluidly communicating with the first outlet of the filter assembly.

3. The arrangement of claim 2 wherein the outlet of the dip leg is positioned in the pressure vessel to discharge catalyst particulates into the lower region containing the fluidized bed.

4. The arrangement of claim 1 wherein the filter assembly and the dip leg are located in a separate housing outside of the pressure vessel, the dip leg being positioned below the filter assembly, wherein the inlet of the filter assembly fluidly communicates with the upper region of the pressure vessel, and wherein the housing has a filtered gas outlet fluidly communicating with the first outlet of the filter assembly.

5. The arrangement of claim 4 wherein the outlet of the dip leg fluidly communicates with the lower region of the pressure vessel containing the fluidized bed.

6. The arrangement of claim 1 wherein the filter assembly includes first and second tube sheets and a plurality of filter tubes supported between the first and second sheets, each filter tube including a filter medium.

7. The arrangement of claim 6 wherein the feed side of the filter medium includes the inner side of each filter tube and the filtrate side of the filter medium includes the outer side of each filter tube.

8. The arrangement of claim 6 wherein each filter tube has opposite open ends.

9. The arrangement of claim 1 wherein the pressure vessel comprises a regenerator vessel.

10. The arrangement of claim 9 wherein the regenerator vessel includes a regenerated catalyst particulate outlet in the lower region of the regenerator vessel.

11. The arrangement of claim 9 further comprising a hot gas supply coupled to the gas inlet of the regenerator vessel.

12. An arrangement for removing catalyst particulates from a gas, the arrangement comprising:
a regenerator vessel having a lower region arranged to contain a fluidized bed including catalyst particulates suspended in a gas, an upper region arranged to receive gas and entrained catalyst particulates dispersed from the fluidized bed, a gas inlet for supplying gas to the lower region containing the fluidized bed, a regenerated catalyst particulate outlet in the lower region, and a filtered gas outlet in the upper region;
a filter assembly supported in the upper region of the regenerator vessel to receive the gas and entrained catalyst particulates dispersed from the fluidized bed, wherein the filter assembly includes an inlet, first and second outlets, and a permeable filter medium having a feed side and a filtrate side isolated from the feed side by the filter medium, wherein the filter assembly defines a first flow path between the inlet and the first outlet through the filter medium from the feed side to the filtrate side, the first outlet fluidly communicating with the filtered gas outlet of the regenerator vessel, wherein the filter assembly further defines a second flow path between the inlet and the second outlet tangentially along the feed side of the filter medium, and wherein the filter assembly further includes a safety filter positioned in the first flow path between the filter medium and the first outlet of the filter assembly; and a dip leg supported in the regenerator vessel below the filter assembly, the dip leg having an inlet and an outlet, wherein the second outlet of the filter assembly is fluidly coupled to the inlet of the dip leg and the outlet of the dip leg is arranged to discharge catalyst particulates into the lower region containing the fluidized bed.

13. The arrangement of claim 12 wherein the filter assembly includes upper and lower tube sheets and a plurality of filter tubes supported vertically between the upper and lower tube sheets, each filter tube including a filter medium.

14. The arrangement of claim 13 wherein the feed side of the filter medium includes the inner side of the filter tube and the filtrate side of the filter medium includes the outer side of each filter tube.

15. The arrangement of claim 13 wherein each filter tube has opposite open ends.

\* \* \* \* \*